Patented Apr. 6, 1948

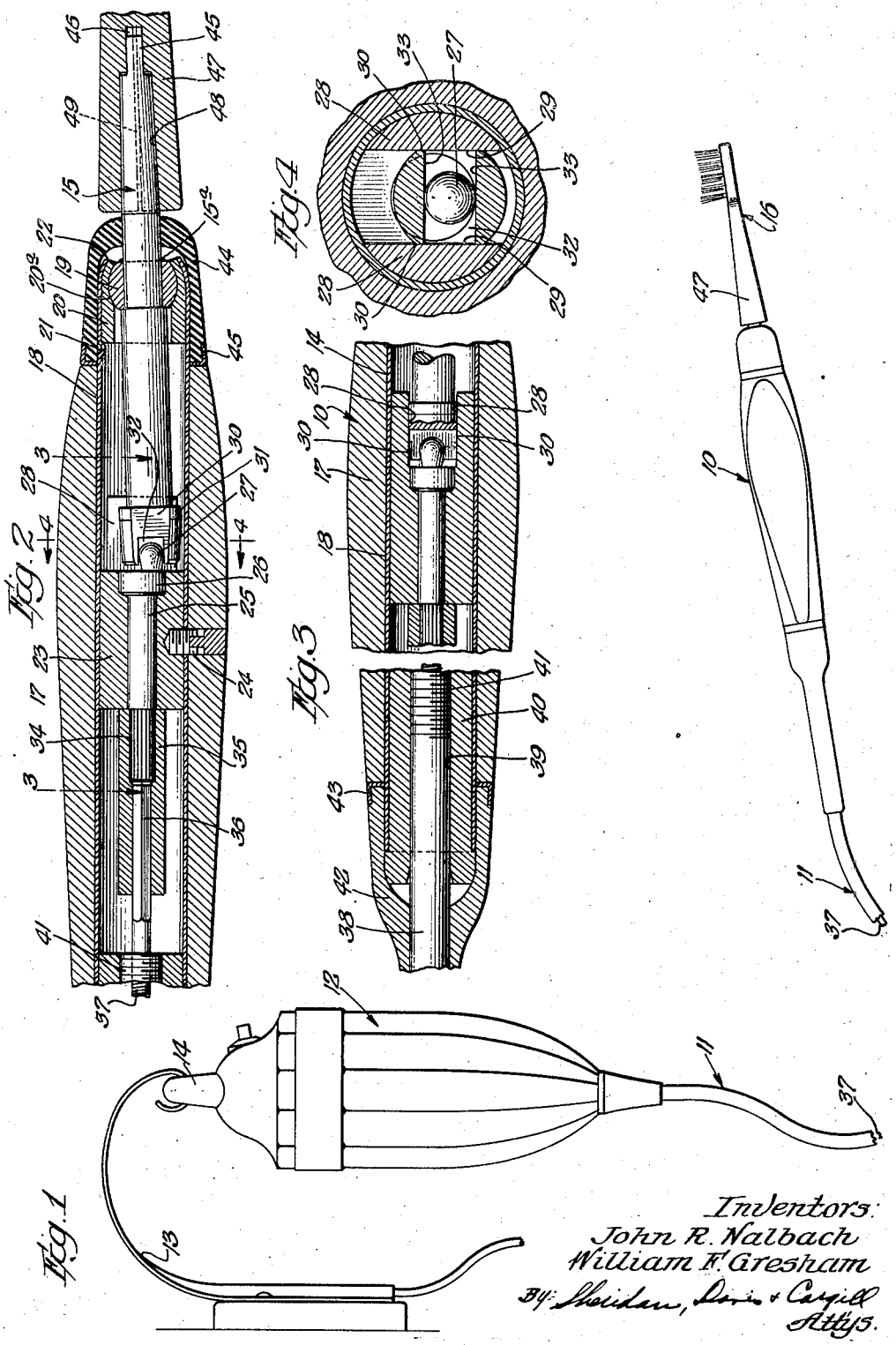

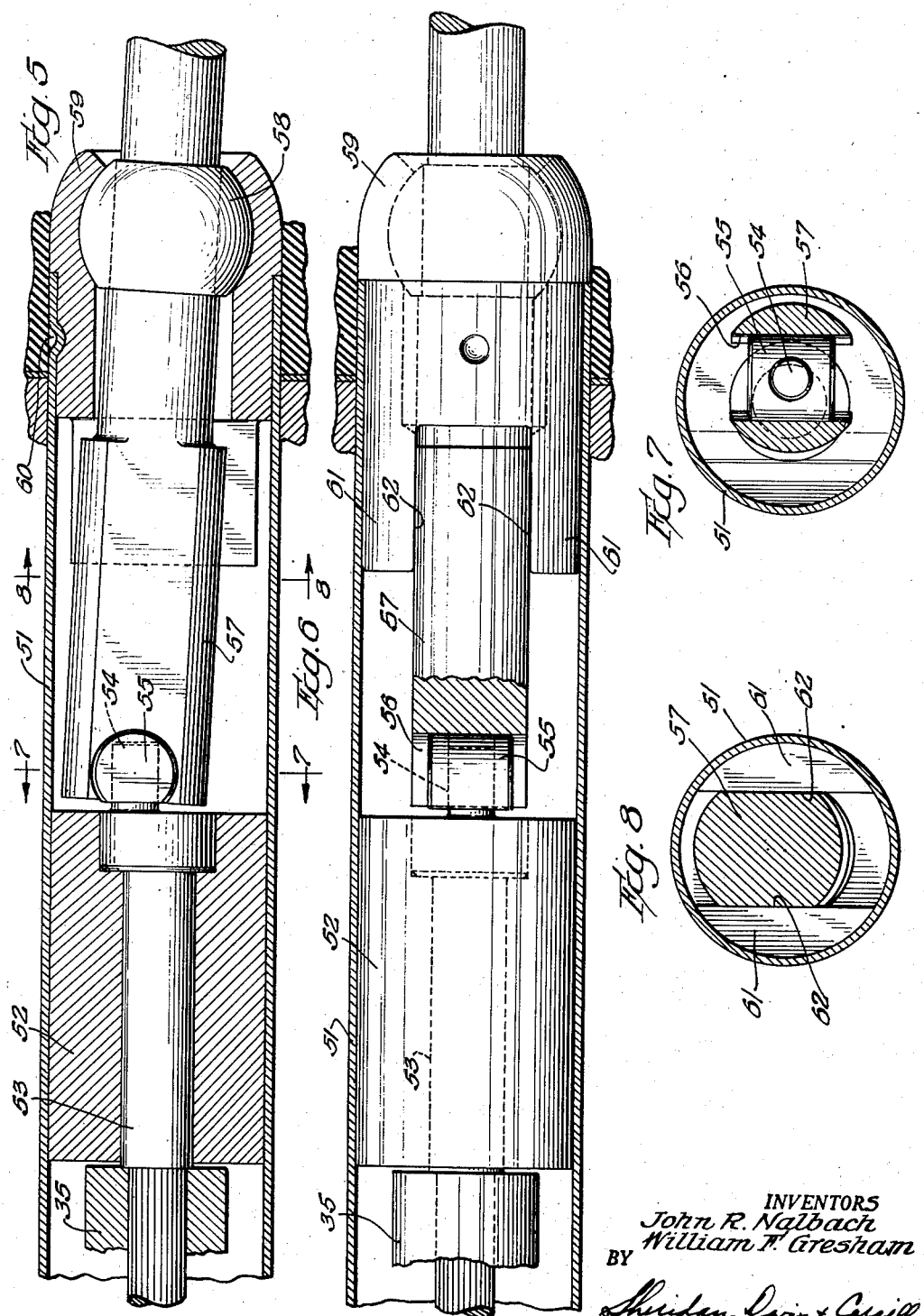

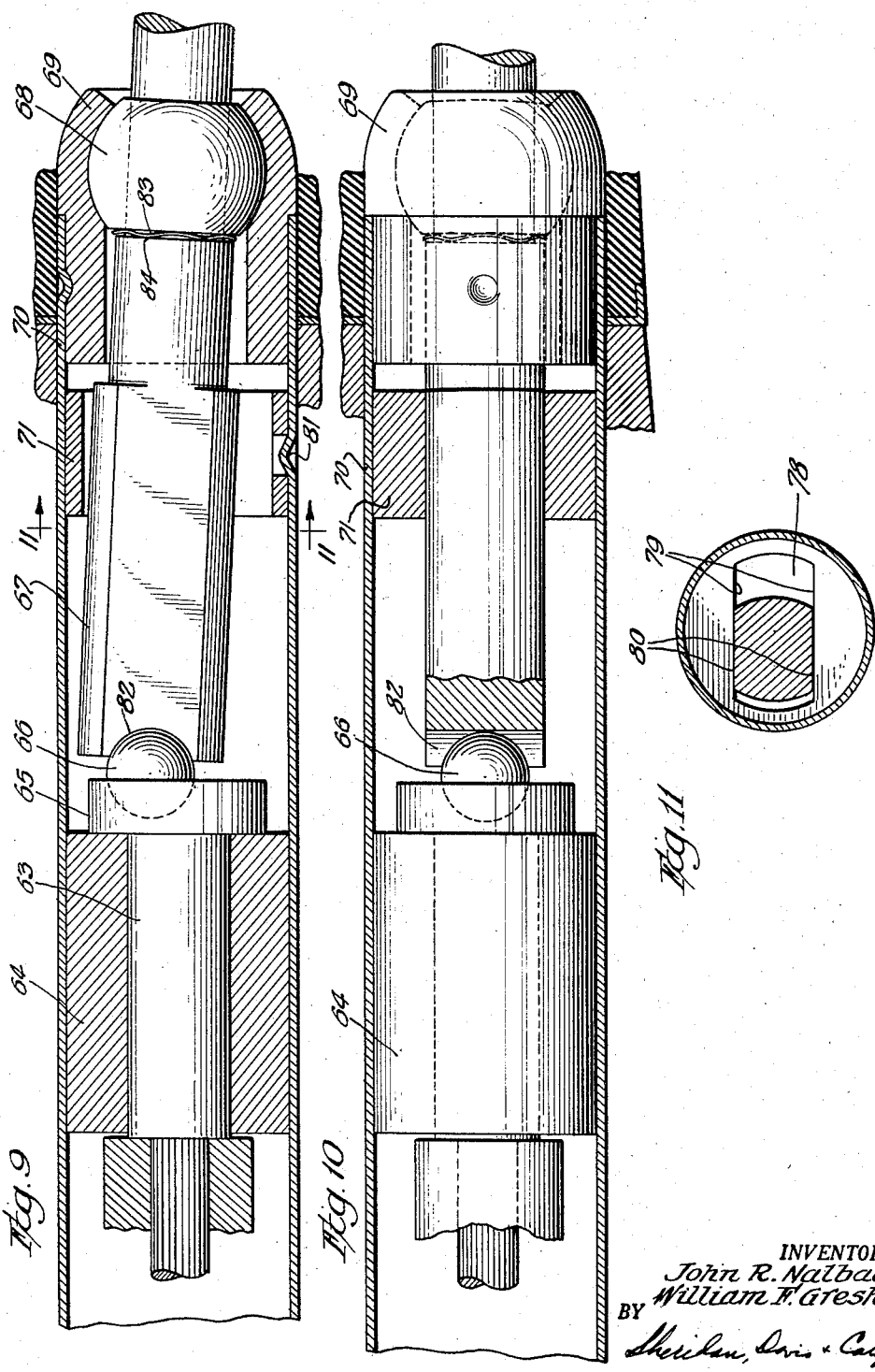

2,439,262

UNITED STATES PATENT OFFICE 2,439,262

POWER-OPERATED MECHANISM

John R. Nalbach, Oak Park, and William F. Gresham, Chicago, Ill.

Application October 26, 1944, Serial No. 560,466

7 Claims. (Cl. 74—48)

This invention relates to improvements in power operated mechanism.

One object of the invention is to provide improved hand-manipulable mechanism for operating a cleansing instrumentality, message device, applicator, tool, or other operable element.

Another object of the invention is to provide an operating mechanism the parts of which can be assembled readily within a simple tubular casing, such as a brass or other metallic tube.

A further object of the invention is to provide a mechanism having power translating elements housed within a tubular casing that in turn is located within a hand-grip which preferably is formed of plastic material cast or molded about the casing.

An additional object of the invention is to provide improved means for translating rotary movement of driving means extending into a tubular casing at one end thereof into rocking movement in an element extending from the other end of the casing.

Other objects of the invention are to provide motion translating mechanism adapted to be assembled readily within a simple tubular casing; means for conforming a bushing to a bearing member to provide a close fit there-between notwithstanding tolerance variations; means for readily attaching and detaching an operated element to an actuating element and various other features of construction and arrangement of parts that will be apparent from a consideration of the following specification and accompanying drawings wherein Figure 1 is a broken perspective view of a power operated tooth brush actuating mechanism which is illustrative of the present invention;

Figure 2 is an enlarged longitudinal sectional view of the motion translating mechanism with the rear portion thereof broken away;

Figure 3 is a similar view with the forward portion broken away and taken on a plane at right angles to the plane of Figure 2;

Figure 4 is an enlarged transverse sectional view taken on line 4—4 of Figure 2;

Figure 5 is a broken longitudinal sectional view of a casing having therein a modified form of motion translating apparatus;

Figure 6 is a view similar to Figure 5 but taken on a plane at right angles to the section plane of Figure 5;

Figure 7 is a sectional view taken on line 7—7 of Figure 5;

Figure 8 is a sectional view taken on line 8—8 of Figure 5;

Figure 9 is a broken longitudinal sectional view of a casing having therein a further modification of the motion translating mechanism;

Figure 10 is a view similar to Figure 9 but taken on a plane at right angles to the section of Figure 9;

Figure 11 is a view taken on line 11—11 of Figure 9.

In the drawings the apparatus therein shown for illustrative purposes comprises a manually manipulable member, indicated generally by the numeral 10, which constitutes a casing for the improved mechanism hereinafter described. Such mechanism is adapted to be operated by a flexible shaft 11 which is driven by a motor 12 that may be removably suspended from a wall-attached, preferably resilient, bracket 13 by means of a vibration-insulating ring 14 of rubber or the like that is attached to the upper end of the motor casing.

The mechanism within the handle 10 operates any appropriate element that is adapted to be releasably attached to an actuating member 15 extending forwardly from the casing 10. In the present illustration of the invention the element shown is a tooth brush 16, but it will be apparent from a consideration of the specification that other suitable elements may be operated by the mechanism, such as massaging, polishing, shaving or like elements.

In Figures 2, 3 and 4 of the drawing the motion translating mechanism is illustrated as housed within the manipulatable handle indicated generally by the numeral 10. The handle 10 as shown comprises a hand grip portion 17 within which a simple tubular casing 18 is enclosed, except at the ends thereof where the casing projects beyond the grip. The hand grip portion of the handle 10 preferably is formed of a plastic composition that may be molded about the tube 18 although, if desired, it may be pre-formed and thereafter chambered to receive the tubular casing 18.

The actuating element 15 extends through a spheroidal bearing 19 which is movably retained within a bearing cavity formed in the internal wall of a generally cylindrical bushing 20 that is located in the forward end of the casing 18.

The bushing 20 is of suitable bearing metal, as bronze, and at one end is provided with a cylindrical counter bore of the maximum diameter of the bearing 19 but which at its inner end terminates in a curved or semi-spherical portion 20a corresponding to the contacting portion of bearing. After assembly of the two parts, the bushing is radially compressed at its outer portion into contact with the bearing surface of the bearing 19 as shown in Figure 2. A substantially perfect fit between the two members is thereby obtained.

The bushing 20 is positioned within the forward end of the tubular casing 18 and the latter is then compressed radially into contact with the curved surface of the bushing to retain it against outward displacement during use, although the bushing can be forced from the tube by suitable pressure exerted on the inner end thereof. Such removal may be required for replacement or repair purposes. The tube 18 preferably is of cold drawn brass or other suitable seamless metal tube stock having the working characteristic required. The actuating member 15 and bearing 19 are oscillatable in the seat of the latter provided by the bushing 20. Rearward movement of the bushing is restrained by any suitable means, as by a depression 21 formed in the casing 18 at the rear end of the bushing. Forward movement of the actuating member 15 through the bearing is prevented and proper positioning of the bearing on the member 15 is provided by a shoulder 22 provided on the actuator 15 and which contacts the rear plane face of the bearing. Rearward movement of the member 15 with reference to the bearing is prevented by providing a pressed fit between them or by other means, as by upsetting the metal of the actuator at the forward edge of the bearing as shown at 15a.

Novel mechanism is provided for oscillating the actuator 15 and bearing 19 in the seat of the latter for effecting the operation of the operated element, such as the toothbrush 16 which is removably carried on the forward end of the actuator. The mechanism for operating the actuator 15 comprises simple means that are insertable longitudinally in the tubular casing 18 for translating rotary movement of a motor driven member into rocking or oscillatory movement in the actuator 15. The translating mechanism comprises a bushing 23 which is positioned within the casing 18 and secured in position against rotation by having a pressed fit within the casing or by a set-screw 24 or the like as shown in Figure 2. The bushing provides a bearing for a driven shaft 25 having a head 26 from which extends an eccentric in the form of a pin 27 having a semi-spherical forward end. The bushing 23, in the form illustrated in Figures 2, 3 and 4 is slotted or bifurcated at its forward end to provide a pair of forwardly extending guides 28 having spaced parallel plane guiding surfaces 29. Between the surfaces 29 opposed plane faces 30 of a head or enlargement 31 of the inner end of the actuator arm 15 have contact for guiding the rocking movement of the latter. The head 31 of the actuator arm is provided with a transverse slot 32 in a plane normal to the planes of the faces 30, the distance between the horizontal faces 33 of the slot 32 being sufficient to receive the pin 27 for point contact of the latter with each of the faces 33.

The guide extensions 28 permit rocking movement of the actuator arm 15 in a single plane only as the eccentric rotates and hence the arm rocks the operated element, such as the brush 16, about the bearing 19 as a pivot or fulcrum point.

The rear end of the shaft 25 projects from the bushing 23 and may be milled as shown in Figure 2, if desired, and press-fitted into a cylindrical recess 34 within the forward portion of a coupler member 35. The remaining portion of the coupler is shown with an axial passage that is shown as square in cross-section for receiving the square end piece or driving tang 36 of the flexible helical driving member 37 located within the non-rotatable sheath 38 of the shaft assembly 11. The inner end of the sheath 38 extends into an axial passage 39 of a sleeve 40 which preferably has a pressed fit with the rear end of the tubular casing 18. The inner end portion of the passage 39 is threaded, as indicated at 41 and into engagement with said threads the fabric sheath is adapted to be turned for releasably retaining the tang 36 in operative driving relation within the cooperating passage of the coupler 35.

At the rear end of the handle 10 a flexible member 42 is shown, preferably made of rubber, that firmly grips the adjacent portion of the sheath 38 and also the rear projecting end of the casing 18 as shown in Figure 2. The member 42 resists acute bending of the flexible shaft in use and by the gripping action thereof on both the shaft 11 and the end of the handle assembly resists accidental separation thereof. An ornamental ferrule 43 is shown in Figures 1 and 3 enclosing the forward end of the member 42.

The forward end of the handle is provided with means for sealing the same to prevent entrance into the mechanism of foreign matter, such as tooth paste, or powder, water, massaging cream or the like. The sealing means shown comprises an elastic member 44 that at its forward end grips the actuator arm 15 and at its inner end is distended over into snugly fitting relation with the adjacent end of the casing 18. An ornamental ferrule 45, similar to ferrule 43, is provided for embracing the rear end of the seal 44 as shown in Figures 1 and 3.

The working portion of the actuator arm 15 that projects beyond the seal 44 may be provided with any suitable means for releasably engaging the element to be operated. In the structure shown in the drawings the wall of the actuator 15 extending beyond the sealing member 44 is tapered and at the extreme forward end is provided with a tang 45 that is arranged to seat in a suitably shaped recess 46 in the hollow shank or shaft of the operated element to prevent relative rotation of one with respect to the other. A tooth brush 16 being the operated element shown in the drawing, the shank 47 thereof has an internal tapered passage 48 slightly smaller over-all than the dimension of the tapered portion of the actuator arm 15 and is shown with a slit 49 along an element of the shank to provide sufficient expansibility to permit the tapered portion of the arm to be pressed snugly into frictional gripping engagement with the shank for releasably retaining the brush on the arm 15 with the tang 45 within a socket 46 in the inner end of the receiving passage 48 to prevent relative rotation of the brush with respect to the arm.

The receiving socket 46 of the shank of the operated element is in a plane such that with the brush in operating position, the bristles of the brush extend in directions normal to the plane within which the arm 15 oscillates whereby the ends of the bristles move substantially parallel to the teeth when held against the same, with the handle 10 in horizontal position.

It will be seen that the above described translating mechanism is formed of simple parts, all of which can be assembled readily within the metal tubular casing 15. For example, the actuator arm 15, bearing 19 and bushing 20 can be assembled and the sub-assembly inserted in the forward end of the casing 18 and the forward exposed portion of the casing then compressed upon the bushing to confine the same in position against the abutment or indented portion 21.

The bushing 23, shaft 25, and coupler 35 can be assembled and inserted in the rear end of the casing and secured in position by the set screw 24. Thereafter the sleeve 40 can be pressed into the rear of the casing and the flexible shaft connected in driving relation as above described. The flexible member 42, and the seal 44 can then be attached to the respective ends of the casing, concealing the ends thereof that project beyond the hand-grip 17 and sealing the mechanism against entrance of water or other foreign substances.

The operation of the motor 12 operates the driving element 37 of the shaft 11 and by means of the squared or otherwise appropriately formed end 36 of the shaft, rotates the coupler 35 and the shaft 25. The eccentric 27 rotates in the space between the guide members 28 formed by bifurcating the end of the bushing 23 and by reason of the disposition of the eccentric within the slot 32 of the actuator, the latter is oscillated or rocked by the rotation of the eccentric.

The distance from the bearing 19 to the bristles of a brush or of a working portion of other operated attachments, determines the throw or arc of movements of such working portions by the actuator arm of a given device. The throw of the bristles of a brush for example can be increased or decreased by increase or decrease of the length of a brush shank, the operative throw of the eccentric and the length of the inner portion of the actuator arm remaining the same. Hence the throw or range of movement of a particular element can be varied by varying the length of its shank by means of which it is attached to the actuator arm, the shanks of various operated elements being designed to fit upon a common actuator shaft 15.

It will be noted that by reason of the improved structural features shown and described, the molded hand grip 17 is not utilized functionally except as a handle and to stiffen or support the tubular casing. Proper fitting of parts thus is not dependent upon dimensional accuracy of the molded handle since the internal diameter of the tubular casing 18 determines the required external diameter of the bushings 20 and 23 and sleeve 40 which can be made economically and with precision on automatic screw machines or the like.

The motion translating mechanism shown and described comprising the tandemly arranged rotary shaft 25 and the rock arm 15, enables the mechanism to be housed within a tubular casing of small diameter. For example, a tube having an outside diameter of one half inch provides adequate space for the described mechanism designed for operating a tooth brush or like small operated element. Such relatively small diameter tubular casing makes feasible a hand grip portion that is not so large as to be clumsy or inconvenient in use and since brass or bronze tubes are attainable in specified internal diameters, the assembling of preformed parts therein from the ends of the casing is relatively simple. The hand grip, while it stiffens the tubular casing, and preferably is molded in situ thereon may be formed of any of various available plastics selected for desirable characteristics not necessarily including structural strength or machinability since the hand grip portion is not relied on for anchoring or providing bearing portions for any of the operating parts of the mechanism.

In the modified form of the invention shown in Figures 5 to 8 inclusive a casing 51 of tubular form, similar to casing 18 above described, is provided with a bushing 52 therein within which is journalled a rotatable shaft 53, said shaft having a forwardly projecting cylindrical eccentric pin 54. A piston 55 having a cylindrical bore therein to receive the pin 54 is received within a cylindrical passage 56 in the adjacent end of an actuator member 57 which is provided with a spheroidal bearing 58 journalled in a bushing 59 which is secured in the forward end of the casing 51 by any appropriate means, preferably means which permits the removal of the bushing, such as by staking as indicated at 60. The bushing 59, at its forward end projects from the casing 51 and is compressed or swaged upon the semi-spherical surface of the bushing 58, thus providing substantially a perfect fit.

Guiding means for the actuator 57 comprises a pair of members 61 formed by slotting the rear end of the bushing 59, thus providing a pair of parallel spaced apart walls 62 which embrace there between the plane side walls of the actuator member 57 and constrain the actuator member for rocking movement in a single plane. The movement described is imparted to the actuator upon the rotation of the shaft 53 which is driven in a manner similar to the shaft 25 of the above described modification. As the shaft 53 rotates, the eccentric 54 rotates also and in so doing effects a reciprocating movement of the piston 55 within the passage 56. This construction enables the eccentric 54 to fit closely within the receiving bore of the piston and permits the latter to fit closely within the passage 56 thereby avoiding noise in operation.

In the form of the invention shown in Figures 9 to 11, inclusive, a driven shaft 63 is journalled in a bushing 64 and at its forward end is provided with a head 65 having substantially a semispherical socket in which is received a steel or other wear resisting ball 66. An actuator member 67 is provided with a spheroidal bearing 68 which is journalled in the compressed portion of the bushing 69 which, as in the above forms of the invention, is secured by any suitable means in the forward end of the casing 70. For the purpose of constraining the rocking movement of the member 67 to a single plane, guide means is provided in the form of a short cylinder or plinth 71 having a recess 78 therein which is provided with parallel plane walls 79. The actuator 67 extends through the passage 78 and is constrained to rock in a single plane by reason of the sliding contact of the plane walls 80 thereof with the cooperating guide walls 79 of the passage. The guide member 71 is shown as formed separately from the bushing 69 and is secured in a casing 70 as by staking as indicated at 81.

The rear end of the actuator 67 is provided with a semi-cylindrical slot 82 extending transversely of said end and into which the forwardly projecting portion of the ball 66 is seated. The ball 66 being eccentrically mounted with reference to the axis of rotation of the shaft 68, revolves about said axis during operation of the shaft and hence produces rocking movement of the actuator 67 about the bearing 68 as a pivot. During such operation the ball 66 has back and forth movement within the transverse slot 82. The radius of the ball 66 preferably is such as to cause it to fit closely within its receiving socket in the head 65 and also to correspond to the curvature of the transverse slot 82 whereby knocking of the motion translating structure is avoided during operation of the mechanism. A suitable annular spring 83 is shown abutting the bearing 68 and against which an adjacent shoulder 84 bears to permit slight axial movement of the actuator 67 during operation thereof to avoid binding of the ball 66 in the receiving recesses thereof and permits the latter to be of a curvature corresponding to the exterior curvature of the ball.

In the forms of the invention shown in Figures 5 to 11, inclusive, the casings preferably are provided with hand grips molded in situ thereon and exteriorly may correspond to the structure more particularly described above and shown in Figures 1 to 4 inclusive. In all the forms of the invention disclosed the parts of the motion translating mechanisms can readily be assembled within the cylindrical casings shown, notwithstanding that the diameters thereof are relatively small in instances where the invention is used in light weight devices, hand manipulated device, as tooth brush or like operating mechanisms.

While we have shown and described a structure that is illustrative of the improvements, variations in the structure may be utilized within the spirit of the invention.

We claim:

1. A hand manipulable device comprising a tubular casing, a bushing within said casing having an axial passage for a rotatable shaft and having a pair of end members provided with parallel spaced-apart guiding walls, a rotatable shaft in said passage provided with an eccentric rotatable in the space between said guiding walls, an oscillatable bearing in said casing, and a rockable arm in said bearing and having a working end extending to the exterior of said casing at one end of the latter and having a head at the other end disposed in the space between said guiding walls, said head having parallel walls arranged for sliding contact with said guiding walls of said bushing and having a transverse slot normal to the planes of said guiding walls and receiving said eccentric whereby rotation of the latter effects guided rocking movement of said arm about the axis of said oscillatable bearing.

2. A hand manipulable device comprising a tubular metal casing, a bushing in said casing provided with an axial passage for a rotatable shaft, a rotatable shaft in said passage provided with a rotatable eccentric projecting from one end thereof, an arm pivotally mounted in said casing having a working end portion extending to the exterior of the casing through one end thereof and having a head at the other end provided with a transverse slot receiving said eccentric whereby rotation of the latter effects rocking movement of said arm, drive means extending into the other end of said casing for rotating said shaft, and means integral with said bushing comprising a pair of members constituting guide means for constraining the movements of said head to a single plane.

3. A hand manipulable member comprising a tubular casing, a bushing fitting the interior of said casing and provided with an axial passage therethrough, a rotatable shaft in said passage and provided with an eccentric at one end thereof, rotatable driving means for the shaft coupled to the other end thereof, an arm rockably journalled in said casing having a working end portion projecting from one end of the casing and provided with a head portion operatively engaging said eccentric whereby rotation of the latter effects rocking movement of said arm, and means comprising integral extensions of said bushing provided with parallel plane walls for constraining said head to movement in a single plane.

4. A hand manipulable member comprising a tubular casing, a rockable arm journalled in said casing having a working end portion projecting from one end of the casing, said arm having a head at the other end provided with opposed plane parallel surfaces and a transverse slot disposed normal to the planes of said faces, a bushing in said casing having an axial passage therethrough and a slot at one end providing parallel guiding surfaces spaced apart and receiving therebetween said plane surfaces of said head for constraining the latter to move in a single plane, and a driven shaft in said passage provided with an eccentric extending from an end thereof into the slot of said head for translating rotary movement of said shaft into rocking movement in said arm.

5. A hand manipulable device comprising a tubular casing, a rotatable shaft in the casing, a rock arm in said casing provided with means pivotally supporting the same therein and having a working portion projecting through said means to the exterior of the casing, means in said casing spaced inwardly from said pivotal means for constraining said arm to move in a single plane, said arm having the inner end thereof disposed adjacent the forward end of said shaft and having a transverse recess therein, and an eccentric extending from the forward end of said shaft into said recess for slidable movement therein whereby rotation of said shaft is translated into rocking movement in said arm.

6. A device of the class described comprising a casing, a rotatable shaft journalled therein terminating at the forward end within said casing, a rock arm having an inner end disposed adjacent the forward end of said shaft and having a forward end extending from said casing, a rockable bearing for said arm journalled in said casing intermediate the ends of said arms, means in said casing spaced inwardly from said rockable bearing constraining said arm for movement in a single plane, a transverse slot in said inner end of said arm curved in cross section, and an eccentric carried by the forward end of said shaft having a curved surface portion conforming to and seated within said slot for sliding movement therein whereby rotation of the shaft effects rocking movement of said arm.

7. A device for translating rotary movement to rocking movement comprising a rotary shaft, a rock arm having an end disposed adjacent an end of the shaft, said end of said shaft having an eccentrically located semi-spherical recess, said end of said arm having a semi-cylindrical transverse slot corresponding in radius to the radius of said recess, and a spherical member having a radius corresponding substantially to the radii of said recess and slot and confined in said recess and slot by the adjacency of said ends to provide a revoluble driving member operable by said shaft and reciprocable in said slot during the revolving action to effect rocking movement of said arm.

JOHN R. NALBACH.
WILLIAM F. GRESHAM.

REFERENCES CITED

The following references are of record in the file of this patent:

UNITED STATES PATENTS

| Number | Name | Date |
|---|---|---|
| 135,697 | Dame | Feb. 11, 1873 |
| 396,832 | Petherick | Jan. 29, 1889 |
| 470,514 | Simpson | Mar. 8, 1892 |
| 1,112,747 | Wingo | Oct. 6, 1914 |
| 1,286,015 | Johnson | Nov. 26, 1918 |
| 1,454,511 | Hermann | May 8, 1923 |
| 2,107,090 | Swennes | Feb. 1, 1938 |